US006635182B1

(12) United States Patent
Coleman, Jr.

(10) Patent No.: US 6,635,182 B1
(45) Date of Patent: Oct. 21, 2003

(54) FLOATATION PROCESS FOR REMOVAL OF HEAVY METAL WASTE AND ASSOCIATED APPARATUS

(75) Inventor: C. Lamar Coleman, Jr., Mt. Airy, GA (US)

(73) Assignee: Industrial Waste Water Services, LLP, Cornelia, GA (US)

( * ) Notice: Subject to any disclaimer, the term of this patent is extended or adjusted under 35 U.S.C. 154(b) by 85 days.

(21) Appl. No.: 09/849,548

(22) Filed: May 4, 2001

(51) Int. Cl.[7] .............................. C02F 1/24; C02F 1/56; C02F 1/62
(52) U.S. Cl. ..................... 210/705; 210/712; 210/725; 210/727; 210/735; 210/736; 210/738; 210/912; 210/914
(58) Field of Search ................. 210/705, 738, 210/712, 725, 727, 912, 914, 735, 736

(56) References Cited

U.S. PATENT DOCUMENTS

| 3,301,779 A | | 1/1967 | Kovacs |
|---|---|---|---|
| 3,642,617 A | | 2/1972 | Brink et al. |
| 4,005,009 A | * | 1/1977 | Kinoshita et al. |
| 4,490,259 A | | 12/1984 | Coffing |
| 4,551,246 A | | 11/1985 | Coffing |
| 5,055,184 A | | 10/1991 | Carpenter et al. |
| 5,240,600 A | * | 8/1993 | Wang et al. |
| 5,256,304 A | * | 10/1993 | Meyer et al. |
| 5,346,627 A | | 9/1994 | Siefert et al. |
| 5,792,363 A | | 8/1998 | Rodgers |
| 5,833,851 A | | 11/1998 | Adams et al. |
| 6,159,359 A | | 12/2000 | Benesi |

OTHER PUBLICATIONS

Bennett, GF (1988) "The Removal of Oil From Wastewater By Air Flotation: A Review", CRC Critical Reviews in Environmental Control 18(3), p. 189, and 211–215.*

Gallios, GP (1995) "Dissolved Air Flotation of Fine Particles of Salt Type Minerals", Flotation Science and Engineering, edited by Matis, Copyright–Marcel Dekker, Inc.*

* cited by examiner

*Primary Examiner*—Thomas M. Lithgow
(74) *Attorney, Agent, or Firm*—Alston & Bird LLP

(57) ABSTRACT

The present invention is a floatation process and associated apparatus for removing heavy metal waste from various effluent water streams. The process and apparatus generally introduces a population of fine diameter air bubbles and one or more flocculating chemicals into an effluent stream to produce buoyant floc structures that include the heavy metals and that can be removed from the effluent stream. The present invention provides a reliable, cost-effective means of removing heavy metals from effluent water streams.

26 Claims, 1 Drawing Sheet

FLOATATION PROCESS FOR REMOVAL OF HEAVY METAL WASTE AND ASSOCIATED APPARATUS

FIELD OF THE INVENTION

The present invention relates to the removal of heavy metals from effluent streams. More particularly, the present invention relates to the separation of heavy metals from effluent streams by incorporating the heavy metals into buoyant floc structures that float to the surface of the effluent stream.

BACKGROUND OF THE INVENTION

Numerous commercial processes require the removal of suspended solids from fluid streams prior to their recycle or emission into the environment. For example, coating operations, such as electrostatic and powder coating processes, produce effluent streams containing suspended solids.

Manufacturers commonly apply either electrostatic or powder coatings to the surfaces of metal parts, such as parts for appliances and the like. The parts must be cleaned prior to coating because manufacturers generally apply oils and lubricants to the surfaces of the parts to aid in mechanical processing. Although useful during the earlier stages of manufacture, these oils and lubricants are detrimental to any coatings which can be subsequently applied. Therefore, electrostatic and powder coating processes utilize a series of wash and rinse baths prior to coating. Further, a phosphate primer can be applied immediately prior to coating, such as a primer applied from a bath containing zinc or iron phosphate. The baths, particularly the wash and rinse baths, become contaminated over time, leading to off-quality production.

To reduce the level of contamination, a portion of each of the baths is continuously removed as an effluent stream and replaced with fresh solution. The effluent stream exiting the baths must be treated to remove the contaminants, particularly heavy metal contaminants, prior to its emission to the environment. The removal of heavy metals from industrial effluent streams is particularly problematic in light of strict governmental regulations specifying stringent levels of allowable residual heavy metals in effluent water streams emitted to the environment. Particularly stringent regulations have been established for heavy metals deemed harmful to humans, such as mercury, cadmium, zinc, copper, lead, nickel and silver. For example, regulatory agencies have introduced stringent lead standards, resulting in a demand for new treatments that are able to remove lead to extremely low levels (<0.1 ppm in many cases).

Conventional wastewater treatment processes generally remove contaminants via a series of discrete chemical processes, each performed in a separate tank. For example, a conventional waste-water treatment process can consist of a series of tanks in which oils and lubricants are floated to the surface of a first tank and a number of flocculants are then added in a further series of settling tanks at different pHs to gradually precipitate the heavy metals out of the effluent. Following precipitation, the heavy metals are pumped out of the bottom of the tanks as sludge.

Many solids are slow to settle and thicken in their liquid media by gravity alone, further exacerbating the problems involved in their removal from effluent streams. Settling times of up to 3 hours are common, and it is thus frequently necessary to build relatively large settling tanks to accomplish good separation. Therefore, due to the number and size of the various tanks involved, conventional wastewater treatment processes require a significant amount of floor space. In addition, conventional wastewater treatment processes cannot process effluent streams at high flow rates. Treatment rates of about 9 gallons per minute are common, for example. In contrast, the coating processes typically supply the effluent at a much greater volumetric rate. Therefore, due to this unfortunate combination of low treatment rates and high floor space, coating processes have heretofore been forced to either shut down temporarily to allow their wastewater treatment process to catch up, coat only on a single shift but treat wastewater around the clock, or ship a portion of the effluent stream off-site for processing.

SUMMARY OF THE INVENTION

The present invention is directed to compact wastewater treatment processes capable of effectively treating effluent streams containing heavy metal contaminants at high flow rates. The instant wastewater treatment apparatus generally includes a flocculation unit, a bubble generator, a separation chamber, and means for removing the buoyant floc structures. In general, the effluent water is introduced into the flocculation unit where it is brought into contact with flocculating chemicals and air bubbles to produce buoyant floc structures. The stream exiting the flocculation unit then flows into the separation chamber, where the buoyant floc structures are subsequently removed, preferably by the use of a skimmer. In advantageous embodiments, the flocculation unit is comprised of a coiled cylindrical unit, e.g. a coiled section of process piping leading to the separation chamber. The process generally includes introducing small diameter air bubbles and a series of flocculating chemicals into the effluent stream as it flows through the flocculation unit to agglomerate the heavy metal contaminants into buoyant floc structures that float to the surface of the effluent stream. For ease of separation, the effluent stream then flows into a separation chamber at the outlet of the flocculation unit. A skimmer removes the buoyant floc from the surface of the treated effluent stream within the separation chamber.

The present invention generally provides a method of removing heavy metals from an effluent stream that includes providing an effluent stream containing heavy metals; adding an effective amount of at least one of a metal salt and a metal scavenger into the effluent stream to form floc structures including the heavy metals; adding an effective amount of a flocculating polymer to increase the size of the floc structures in the effluent stream; introducing a secondary stream containing gas bubbles into the effluent stream in an effective amount to produce an aerated effluent stream, the combination of the gas bubbles, the at least one of a metal salt and a metal scavenger, and the flocculating polymer forming buoyant floc structures that including the heavy metals; allowing the buoyant floc structures to rise to the surface of the aerated effluent stream; and removing the buoyant floc structures from the effluent stream to produce a treated effluent stream. The buoyant floc structures can be removed from the surface of the effluent stream by processes such as skimming and the like. Exemplary heavy metals which can be removed from the effluent stream include copper, nickel, zinc, lead, mercury, cadmium, silver, iron, manganese, palladium, platinum and mixtures thereof. The method of the present invention is capable of effectively treating effluent streams at flow rates of at least about 10 gallons per minute ("gpm").

In advantageous embodiments, the flocculating polymer is derived from a water soluble polymer ranging in weight from about 500 to about 100,000 and further including from about 5 to about 50 mole percent of one or more functional groups capable of complexing with the heavy metals within the effluent stream to provide buoyant floc structures. In beneficial aspects of that advantageous embodiment, the water-soluble polymer is an ethylene dichloride ammonia polymer and the functional groups are dithiocarbamate salt groups.

Either or both of a metal salt and a metal scavenger are introduced into the effluent stream in various beneficial aspects of the present invention. In beneficial aspects of the present invention, both a metal salt and metal scavenger are employed. In further beneficial aspects, the metal salt is added before the metal scavenger. Exemplary metal salts include aluminum chlorohydrate, aluminum chloride, poly-aluminum chloride, and mixtures thereof. In advantageous embodiments, the metal salt is aluminum chlorohydrate. The metal salt can be present in the effluent stream in an effective amount, ranging from about 25 parts per million ("ppm") to about 100 ppm. Exemplary metal scavengers include metal sulfides, metal (thio)carbonates, metal thiocarbamate, mercaptans and mixtures thereof. Advantageous metal sulfides include sodium polysulfide, sodium monosulfide, and sodium hydrogen sulfide. The metal scavenger can be present in the effluent stream in an effective amount ranging from about 5 ppm to about 25 ppm.

The secondary stream containing air bubbles can be supersaturated with air. The air bubbles within the aerated effluent stream preferably have diameters less than about 60 microns. The air bubbles can be formed by introducing air into a secondary stream and subsequently passing the secondary stream through a double venturi apparatus. The secondary stream containing the air bubbles can then be split into portions and introduced as separate portions into the effluent stream prior to any or all of the following steps: (i) adding the metal salt, (ii) adding the metal scavenger, (iii) adding the polymeric flocculent and (iv) removing the buoyant floc structures.

The invention further relates to an apparatus for performing the methods of the present invention. In one particularly advantageous embodiment, an apparatus for removing heavy metals from an effluent stream that includes a bubble generator for producing air bubbles in water for introduction into the effluent stream; a first chemical supply means for introducing at least one of a metal salt or metal scavenger into the effluent stream; a second chemical supply means for introducing a flocculating polymer into the effluent stream; a flocculation unit formed of a coiled cylindrical conduit having an inlet, an outlet, and a finite length which is in fluid communication with an effluent stream at its inlet and the bubble generator and the first and second chemical supply means along its length, the second chemical supply means positioned downstream of the first chemical supply means, the flocculation unit combining the at least one of a metal, salt or metal scavenger, flocculating polymer, and air bubbles with the effluent stream to form buoyant floc including the heavy metals in the effluent stream; a separation chamber in fluid communication with the outlet of the flocculation unit for separating the buoyant floc from the effluent stream by allowing the buoyant floc to rise to the surface of a volume of the effluent stream; and a means for removing the buoyant floc from the effluent stream adjacent the surface. In advantageous aspects, the first chemical supply means is positioned near the inlet of the flocculation unit and the second chemical supply means is positioned downstream of the first chemical supply means. The flocculation unit can also further include a third chemical supply means for supplying the other of the metal salt or the metal scavenger to the flocculation unit. The third chemical supply means can beneficially be located between the first chemical supply means and the second chemical supply means.

The bubble generator of the present invention can generally be formed from a conduit containing an air inlet into a water stream and two venturi orifices arranged in series. The apparatus of the present invention can further include comprising a means to divide the stream of air bubbles produced by the bubble generator into several portions, as well as a plurality of means for introducing portions of the air bubble stream into the flocculation unit at a variety of locations, such as (i) prior to the first chemical supply means; (ii) prior to the second chemical supply means; (iii) prior to the third chemical supply means and (iv) prior to the outlet of the flocculation unit.

The method of removing heavy metals according to the present invention can be used in various processes, e.g., to fabricate metal parts. Benefits of the present invention include the use of less floor space and higher throughputs than available with conventional sedimentation based wastewater treatment processes traditionally used to treat the effluent streams issuing from metal part fabrication processes. The present invention thus provides a reliable, cost effective means of removing heavy metals from effluent streams.

Further understanding of the methods and systems of the invention will be understood with reference to the brief description of the drawings and detailed description that follows herein.

BRIEF DESCRIPTION OF THE DRAWINGS

Aspects of the invention are illustrated in the following drawing. The elements of the drawing are not necessarily drawn to scale, emphasis instead being placed on clearly illustrating principles of the invention.

DETAILED DESCRIPTION OF THE INVENTION

Figure 1:
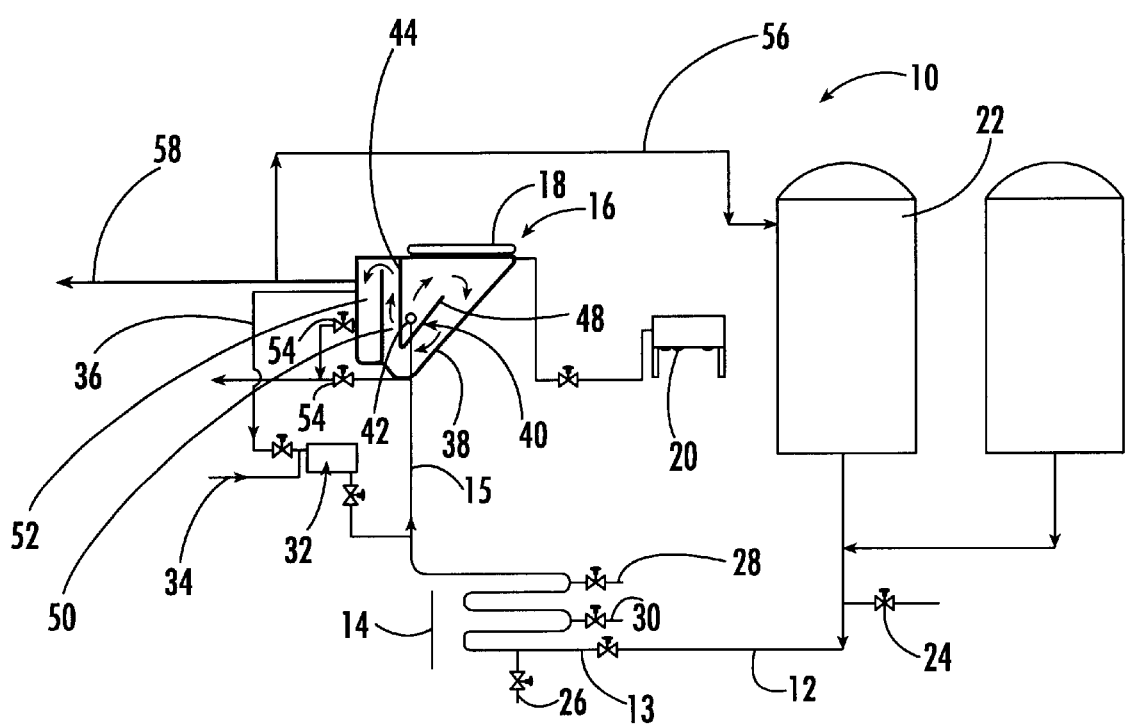
FIG. 1 illustrates a schematic view of the process and apparatus of the present invention.

The present invention will now be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Further, the various control, monitoring, and electrical supply lines have been omitted by and large, to improve clarity of presentation and understanding.

Referring now to FIG. 1, a wastewater treatment system 10 in accordance with one preferred embodiment of the invention is provided. The wastewater treatment system 10 of the present invention generally includes an effluent water stream 12 containing heavy metals; a flocculation unit 14; a separation chamber 16; and a buoyant floc skimmer 18.

The water stream 12 containing heavy metals can be provided by an aqueous effluent stream issuing from any of a number of manufacturing processes, including those used to produce metal parts, such as metal parts coaters and the like. In one advantageous embodiment, the manufacturing process is a powder coating process, such as an electrostatic or powder coating process, and the effluent stream is generated from the rinse and cleaning baths associated with such coating processes. The effluent stream 12 can contain a variety of heavy metals, depending on the manufacturing process involved, including zinc, copper, nickel, lead, mercury, cadmium, silver, iron, manganese, palladium, platinum, and mixtures thereof. Further, the effluent water stream 12 can contain a significant quantity of these heavy metals. Heavy metals can be present in the effluent water stream 12 in amounts ranging from about 0.5 to about 58 ppm, for example. In one aspect of the present invention, an effluent stream 12 is provided containing about 1.5 to about 10.0 ppm of zinc, for example.

The effluent exiting the manufacturing process is generally collected in a holding tank 22 prior to introduction of the effluent stream 12 into the wastewater treatment system 10, and particularly the flocculating unit 14. Prior to initiating the flocculation process within the flocculation unit 14, various cleaners, such as biocides, can also be introduced into the effluent stream 12 exiting the holding tank via supply line 24 to eliminate biological contaminants and the like.

The flocculation unit 14 introduces an effective amount of various flocculating chemicals and an effective quantity and quality of gas bubbles into the effluent stream 12 to produce buoyant floc incorporating the heavy metal contaminants. The flocculation unit 14 is designed to provide a sufficient dwell time for the formation of the buoyant floc. In advantageous aspects, the flocculation unit 14 is further designed to induce turbulent flow within the effluent stream 12 passing through its interior, thereby allowing flocculation to occur. More particularly, in beneficial embodiments, the effluent stream 12 flowing through the flocculation unit 14 remains under turbulent flow during approximately its entire passage through the unit.

In general, the flocculation unit 14 is formed from piping having an inlet 13, an outlet 15, and a finite length. In beneficial embodiments, the flocculation unit 14 is formed from coiled cylindrical conduit, such as a section of coiled piping, as illustrated in FIG. 1. The length and diameter of the flocculation unit is dependent on such factors as the effluent stream 12 flow rate and the level of heavy metal contamination present in the effluent stream 12. Exemplary flocculation unit 14 lengths range from about 8 to about 16 feet from inlet to outlet, and the flocculation unit 14 can further range in diameter from about 2 to about 8 inches.

A variety of flocculating chemicals can be introduced into the effluent stream 12 as it travels through the flocculation unit 14, including metal salts, metal scavengers, flocculating polymers, and the like. In one advantageous embodiment, at least one of a metal salt or metal scavenger is introduced into the effluent stream 12 as it flows through the flocculation unit 14. The metal salt employed can be any metal salt capable of forming floc structures within the effluent stream. Advantageously, the metal salt is an aluminum salt. Exemplary aluminum salts for use in the present invention include aluminum chlorohydrate, aluminum chloride, polyaluminum chloride, and mixtures thereof. In particularly advantageous embodiments, the metal salt is aluminum chlorohydrate. The metal salt can be introduced into the effluent stream passing through the flocculation unit 14 in an effective amount, typically ranging from about 25 to about 100 ppm. As used herein, the term "effective amount" in conjunction with the metal salt refers to that amount sufficient to form suitable floc structures. The metal salts are generally introduced into the effluent stream in the form of an aqueous solution. The pH of the effluent stream prior to the introduction of the metal salt generally ranges from about 9.3 to about 9.5. Following the introduction of the metal salt, the pH of the effluent stream generally ranges from about 6.5 to about 8.5.

Likewise, the metal scavengers suitable for use in the present invention include any metal scavengers capable of forming suitable floc structures with the heavy metals present in the effluent stream 12. Exemplary metal scavengers include metal sulfides, metal (thio)carbonates, metal thiocarbamate, mercaptans and mixtures thereof. In advantageous embodiments, the metal scavenger is a metal sulfide. Beneficial metal sulfides include sodium polysulfide, sodium monosulfide, sodium hydrogen sulfide, and mixtures thereof. The metal scavenger can be present in the effluent stream passing through the flocculation unit 14 in an effective amount, typically ranging from about 5 to about 25 ppm. The metal scavenger is generally introduced into the effluent stream as an aqueous solution. As used herein, the term "effective amount" in conjunction with the metal scavenger refers to that amount sufficient to provide suitable floc structures. Following the introduction of the metal scavenger, the pH of the effluent stream generally ranges from about 6.5 to about 8.5.

At least one flocculating polymer is introduced into the effluent stream as it flows through the flocculation unit 14. Any flocculating polymer capable of creating buoyant floc structures that incorporate the heavy metal contaminants within the effluent stream can be employed. In advantageous embodiments, the flocculating polymer is derived from a water soluble polymer ranging in molecular weight from about 500 to about 100,000 and further including from about 5 to about 50 mole percent of one or more functional groups capable of complexing with the heavy metal contaminants within the effluent stream. In particularly beneficial embodiments, a water soluble ethylene dichloride ammonia polymer containing dithiocarbamate salt groups is employed, commercially available as NALMET® polymer from Nalco Chemical Co. The flocculating polymer can be present in the effluent stream in effective amounts, typically ranging from about 5 to about 25 ppm. As used herein, the term "effective amount" in conjunction with the flocculating polymer refers to that amount sufficient to increase the size of the floc structures. The flocculating polymer is generally introduced into the effluent stream in the form of an aqueous solution. In an alternative embodiment, flocculating polymer is introduced into the effluent stream in the form of an emulsion in oil. Following the introduction of the flocculating polymer, the pH of the effluent stream generally ranges from about 6.5 to about 8.5.

It has been determined that water soluble ethylene dichloride ammonia ("EDA") polymers containing dithiocarbamate salt groups can be used to impart a sufficient rising velocity to floc structures incorporating heavy metal contaminants, thus enabling the resulting floc structures to become buoyant in an aqueous medium. The formation of such buoyant floc structures is surprising in light of the fact that this EDA polymer was developed for use in the sedimentation systems traditionally employed in the treatment of effluent streams containing heavy metals. In fact, the ability to form buoyant floc structures incorporating heavy metals was altogether unexpected. More specifically, it was surprising that buoyant heavy metal floc structures exhibiting sufficient rising velocities could be formed, given the high densities typically exhibited by heavy metals. The rising velocity of the floc is important because it influences the time required to effect separation of the floc from the effluent stream. The appropriate rising velocities for various floc structures is dependent upon a number of factors, including the composition and flow rate of the effluent stream. The present invention imparts suitable rising velocities to floc structures within effluent streams of widely varying compositions and flow rates. For example, the present invention produces floc structures incorporating heavy metals that exhibit suitable rising velocities within aqueous effluent streams contaminated with oils and the like.

The overall purpose of the various flocculating chemicals is to associate the heavy metal contaminants into agglomerated floc structures. In advantageous embodiments, several flocculating chemicals are combined to provide suitable buoyant floc. In one particularly advantageous embodiment, a metal salt, a metal scavenger, and a flocculating polymer are employed to produce a suitable buoyant floc structure. In further beneficial aspects of this advantageous embodiment, the metal salt is introduced into the flocculation unit 14 first, the metal scavenger added second, and the flocculating polymer introduced last. In an alternative embodiment, the metal salt and metal scavenger are added simultaneously, prior to the addition of the flocculating polymer. In yet another alternative embodiment, only one of the metal salt or metal scavenger is employed in conjunction with flocculating polymer. In a final alternative aspect, the flocculating polymer can be employed alone.

Chemical supply means are provided along the length of the flocculation unit 14 as appropriate to facilitate the introduction of the various flocculating chemicals into the effluent stream passing though the flocculation unit. Such chemical supply means can include an inlet port in fluid communication with a valve and/or a pump, for example. In advantageous aspects, a first chemical supply means 26 in fluid communication with the flocculation unit 14 is used to introduce at least one of a metal salt or metal scavenger into the effluent stream and a second chemical supply means 28 is used to introduce a flocculating polymer into the effluent stream. In this embodiment, the first chemical supply means 26 can be positioned near the inlet of the flocculation unit (as shown in FIG. 1) and the second chemical supply means 28 can be positioned downstream of the first chemical supply means. In a further aspect of this embodiment, a third chemical supply means 30, supplying the other of the metal salt or the metal scavenger to the flocculation unit, is positioned between the first chemical supply means 26 and the second chemical supply means 28, e.g., approximately midway between the first and second chemical supply means. The positioning of the various chemical supply means, impacting the subsequent mix time for the respective flocculating chemicals, is dependent on the flow rate and composition of the effluent stream to be treated. In one beneficial embodiment, the various chemical supply means are positioned so as to provide an exemplary dwell time of at least 20 seconds between addition points.

Although not wishing to be bound by theory, it is believed that the use of the multiple flocculents discussed herein produces robust floc structures that are more capable of withstanding the forces associated with their floatation out of the depths of the effluent stream. Specifically, it is believed that the metal salt and/or metal scavenger produce smaller flocculation sites and/or intermediate floc structures. The flocculating polymer can then be used to combine the intermediate floc structures into larger floc structures capable of forming buoyant floc structures. More particularly, it is hypothesized that flocculation sites can be developed within the effluent stream by adding an effective amount of a metal salt into the effluent stream to adjust its pH to between about 6.5 and about 8.5 and by further providing a sufficient dwell time, or mix time, for the flocculation sites to develop, such as an exemplary dwell time of about 20 seconds. Intermediate floc structures can then be produced by adding an effective amount of a metal scavenger to the effluent stream and by further providing a sufficient dwell time for the intermediate floc structures to develop on the flocculation sites, such as an exemplary dwell time of about 20 seconds. Larger floc structures, capable of becoming buoyant, are then produced by adding an effective amount of a flocculating polymer to the effluent stream and by further providing a sufficient dwell time for the flocculating polymer to associate two or more of the intermediate floc structures, such as an exemplary dwell time of about 20 seconds.

In addition to flocculating chemicals, fine diameter air bubbles are also introduced into the effluent stream to produce buoyant floc structures that are capable of rising to the surface. More specifically, a sufficient amount of air is introduced into a secondary stream to supersaturate it, thus producing an aerated secondary stream containing extremely fine air bubbles. A sufficient quantity of the aerated secondary stream is then introduced into the effluent stream to produce an aerated effluent stream. The fine diameter air bubbles decrease the density of the floc structures, thereby allowing the buoyant floc structures to have a sufficient rising velocity to achieve proper separation from the effluent stream in the separation chamber 16, as discussed below. The diameter of the air bubbles also affects the rising velocity of the floc, with fine-diameter bubbles having a higher rising velocity. The size of the air bubbles also determines the force with which they engage the floc. Accordingly, the air bubbles must possess a sufficiently fine average diameter both to impart a suitable rising velocity to the flocculated contaminants and to float the floc structures through the depth of the effluent stream without breaking them up. In advantageous embodiments, air bubbles having a diameter of less than 60 microns are employed.

A bubble generator 32 is used form the air bubbles introduced initially into the secondary stream, and ultimately the effluent stream. The bubble generator 32 generally provides a population of fine diameter air bubbles by dissolving air 34 in a water stream, such as a side stream 36 diverted from the treated effluent stream or a fresh stream of water. The flow rate of the air introduced into the secondary stream generally ranges from about 10 to about 20 cubic feet per hour, while the flow rate of the water in the secondary stream generally ranges from about 35 to about 85 gpm. Advantageously, the secondary stream becomes supersaturated with air. As used herein, the terms "aerated secondary stream" and "secondary stream containing air bubbles" are interchangeable.

In beneficial embodiments, the bubble generator 32 dissolves air within the secondary stream by initially introducing a quantity of air into the secondary stream and subsequently passing the secondary stream at high pressure through an expansion column formed from at least one venturi orifice. The pressure in the secondary stream is reduced as it flows through the expansion column and the air subsequently comes out of solution as fine bubbles. In beneficial aspects of the present invention, the expansion column includes two venturi orifices arranged in series. In an alternative embodiment, electrodes can be employed to produce hydrogen and oxygen bubbles via electrolysis, which would then be used in lieu of the air bubbles described thus far. In further alternative aspects, other gases, such as nitrogen, argon or the like, are employed in place of air to form the bubbles. The aerated secondary stream can be introduced into the flocculation unit 14 at flow rates ranging from about 35 to about 85 gpm. In advantageous embodiments, a sufficient amount of the aerated secondary stream is introduced into the effluent stream to produce an aerated effluent stream that can produce buoyant floc structures.

The aerated secondary stream exiting the bubble generator 32 can be introduced into the effluent stream passing through the flocculation unit 14 at any of numerous points along the length of the flocculation unit 14. Further, the aerated secondary stream can be introduced to the flocculation unit either as a single stream, or split into multiple streams. In one advantageous embodiment, the entire aerated secondary stream is introduced into the flocculation unit following the addition of the flocculation chemicals, as shown in FIG. 1. In an alternative embodiment, the aerated secondary stream is divided into portions and separate portions of the aerated secondary stream are introduced into the effluent stream flowing through the flocculation unit 14 (i) prior to adding the metal salt, (ii) prior to adding the metal scavenger, (iii) prior to adding the flocculating polymer, and/or (iv) after adding the flocculating polymer.

It is believed that the buoyant floc structures formed in the flocculation unit 14 rise to the surface of the effluent stream before the effluent stream reaches the outlet 15 of the flocculation unit 14, thus forming a floating floc layer and an underlying treated water layer. To facilitate the removal of the buoyant floc layer from the underlying treated water layer, the effluent stream is introduced into a separation chamber 16. The separation chamber 16 provides sufficient volume to the effluent stream to allow separation of the buoyant floc from the treated water stream and removal of the buoyant floc. In general, the separation chamber 16 is formed from an open vessel having a diameter greater than the flocculation unit, allow separation and removal of the buoyant floc.

In one advantageous embodiment, the separation chamber 16 defines a generally V shaped tank 38 that includes at least two elongated and fluidly connected chambers. The first chamber 40, generally defined by the interior volume of a smaller generally V-shaped chamber 40 within the separation chamber 16, has an inlet port 42 for receiving the flocculated effluent stream. The inlet port 42 is located in a lower portion of the V-shaped chamber. One leg 44 of the V-shaped inner chamber extends upward to the surface of the separation chamber, to provide a baffle that precludes the entering flocculated effluent stream from flowing into the remaining other chambers discussed below. The buoyant floc within the effluent stream then rises to the surface of the separation chamber. The treated effluent stream of water flows over the shorter leg 48, into a second chamber 50. The second chamber 50 is generally defined by the area between the separation unit 38 and the walls defining the first chamber 40. The second chamber 50 is designed to transport the treated effluent stream away from the buoyant floc floating at the surface of the separation chamber 16. In the advantageous embodiment illustrated in FIG. 1, a third chamber 52 is also provided in the separation chamber 16. The third chamber 52 is in fluid communication with the second chamber 50 and has a generally rectangular shape. Drain valves 54 present in the second 50 and third 52 chambers allow any solids which can settle out over time to be removed from the separation chamber 16. As discussed above, a portion of the treated effluent can be diverted for use as the water stream 36. The remainder of the treated effluent water exits the separation chamber 16 as a treated effluent stream that can be either recycled within the process 56 or released back into the water system 58.

The buoyant floc can be removed from the surface of the separation chamber using any means known in the art. In the advantageous embodiment illustrated in FIG. 1, a skimmer 18 is employed to remove the buoyant floc structures from the separation chamber 16. The skimmer 18 is generally formed from a series of skimming paddles attached to a drive chain. After it is skimmed off, the buoyant floc is sent to a sludge press 20 for dewatering. Any suitable sludge press or filter press known in the art can be employed. The resulting sludge or filter cake is disposed of as solid waste. The water removed from the sludge or filter press can be returned to the water-treatment process or released back into the process water stream.

The beneficial process and apparatus of the present invention allows effluent streams containing heavy metals in amounts of up to about 58 ppm to be treated at flow rates of at least about 200 gpm to produce treated effluent streams containing less than 0.05 ppm heavy metal.

Many modifications and other embodiments of the invention will come to mind to one skilled in the art to which this invention pertains having the benefit of the teachings presented in the foregoing descriptions and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of illustration.

What is claimed is:

1. A method of removing heavy metals from an effluent stream comprising:

(a) providing an effluent stream containing heavy metals;
   (b) adding an effective amount of both a metal salt and a metal scavenger into the effluent stream to form floc structures including the heavy metals;
   (c) adding an effective amount of a flocculating polymer to increase the size of the floc structures in the effluent stream;
   (d) introducing a secondary stream containing gas bubbles into the effluent stream in an effective amount to produce an aerated effluent stream, wherein the combination of the gas bubbles, the metal salt, the metal scavenger, and the flocculating polymer form buoyant floc structures including the heavy metals;
   (e) allowing the buoyant floc structures to rise to the surface of the aerated effluent stream; and
   (f) removing the buoyant floc structures from the effluent stream to produce a treated effluent stream.

2. A method according to claim 1, wherein the flocculating polymer is derived from a water soluble polymer ranging in molecular weight from about 500 to about 100,000 and further including from about 5 to about 50 mole percent of one or more functional groups capable of complexing with the heavy metals to provide buoyant floc structures.

3. A method of removing heavy metals from an effluent stream comprising:

(a) providing an effluent stream containing heavy metals;
   (b) adding an effective amount of at least one of a metal salt and a metal scavenger into the effluent stream to form floc structures including the heavy metals;
   (c) adding an effective amount of an ethylene dichloride ammonia polymer including dithiocarbamate salt functional groups to increase the size of the floc structures in the effluent stream;

(d) introducing a secondary stream containing gas bubbles into the effluent stream in an effective amount to produce an aerated effluent stream, wherein the combination of the gas bubbles, the at least one of a metal salt and a metal scavenger, and the ethylene dichloride ammonia polymer form buoyant floc structures including the heavy metals;

(e) allowing the buoyant floc structures to rise to the surface of the aerated effluent stream; and (f) removing the buoyant floc structures from the effluent stream to produce a treated effluent stream.

4. A method of fabricating metal parts incorporating the method of removing heavy metals according to claim 1.

5. A method according to claim 1, wherein step (b) comprises adding the metal salt before adding the metal scavenger.

6. A method according to claim 1, wherein said step of introducing a secondary stream comprises introducing a secondary stream that is supersaturated with air.

7. A method according to claim 1, wherein said gas bubbles have diameters less than about 60 microns.

8. A method according to claim 1, wherein the heavy metals are selected from the group consisting of copper, nickel, zinc, lead, mercury, cadmium, silver, iron, manganese, palladium, platinum and mixtures thereof.

9. A method according to claim 1, wherein the metal salt is selected from the group consisting of aluminum chlorohydrate, aluminum chloride, polyaluminum chloride, and mixtures thereof.

10. A method of removing heavy metals from an effluent stream comprising:

(a) providing an effluent stream containing heavy metals;

(b) adding an effective amount of at least one of aluminum chlorohydrate and a metal scavenger into the effluent stream to form floc structures including the heavy metals;

(c) adding an effective amount of a flocculating polymer to increase the size of the floc structures in the effluent stream;

(d) introducing a secondary stream containing gas bubbles into the effluent stream in an effective amount to produce an aerated effluent stream, wherein the combination of the gas bubbles, the at least one of aluminum chlorohydrate and a metal scavenger, and the flocculating polymer form buoyant floc structures including the heavy metals;

(e) allowing the buoyant floc structures to rise to the surface of the aerated effluent stream; and (f) removing the buoyant floc structures from the effluent stream to produce a treated effluent stream.

11. A method of removing heavy metals from an effluent stream comprising:

(a) providing an effluent stream containing heavy metals;

(b) adding an effective amount of at least one of a metal salt and a metal scavenger selected from the group consisting of metal sulfides, metal (thio)carbonates, metal thiocarbamate, mercaptans and mixtures thereof into the effluent stream to form floc structures including the heavy metals;

(c) adding an effective amount of a flocculating polymer to increase the size of the floc structures in the effluent stream;

(d) introducing a secondary stream containing gas bubbles into the effluent stream in an effective amount to produce an aerated effluent stream, wherein the combination of the gas bubbles, the at least one of a metal salt and a metal scavenger, and the flocculating polymer form buoyant floc structures including the heavy metals;

(e) allowing the buoyant floc structures to rise to the surface of the aerated effluent stream; and (f) removing the buoyant floc structures from the effluent stream to produce a treated effluent stream.

12. A method according to claim 11, wherein said metal sulfide is selected from the group consisting of sodium polysulfide, sodium monosulfide, sodium hydrogen sulfide, and mixtures thereof.

13. A method according to claim 1, wherein said removing step further comprises skimming the effluent stream adjacent the surface to remove the floc structures.

14. A method according to claim 1, wherein said step of introducing a secondary stream containing air bubbles further comprises forming air bubbles by introducing air into the secondary stream and subsequently passing the secondary stream through two venturi orifices arranged in series.

15. A method of removing heavy metals from an effluent stream comprising:

(a) providing an effluent stream containing heavy metals;

(b) adding an effective amount of at least one of a metal salt and a metal scavenger into the effluent stream to form floc structures including the heavy metals;

(c) adding an effective amount of a flocculating polymer to increase the size of the floc structures in the effluent stream;

(d) introducing a secondary stream containing gas bubbles into the effluent stream in an effective amount to produce an aerated effluent stream, wherein the combination of the gas bubbles, the at least one of a metal salt and a metal scavenger, and the flocculating polymer form buoyant floc structures including the heavy metals, said introducing step further comprising splitting the secondary stream into portions and introducing separate portions of the secondary stream containing air bubbles into the effluent stream (i) prior to adding the metal salt, (ii) prior to adding the metal scavenger, (iii) prior to adding the flocculating polymer, and (iv) after adding the flocculating polymer;

(e) allowing the buoyant floc structures to rise to the surface of the aerated effluent stream; and (f) removing the buoyant floc structures from the effluent stream to produce a treated effluent stream.

16. A method according to claim 1, wherein said step of allowing the buoyant floc structures to rise to the surface of the effluent stream further comprises transporting the effluent stream containing the buoyant floc structures into a separation chamber.

17. A method according to claim 16, wherein the separation chamber is at atmospheric pressure.

18. A method of removing heavy metals from an effluent stream comprising:

(a) providing a wastewater stream containing heavy metals;

(b) adding an effective amount of at least one of aluminum chlorohydrate and metal sulfide into the effluent stream to form floc structures including the heavy metals;

(c) adding an effective amount of an ethylene dichloride ammonia polymer ranging in molecular weight from about 500 to about 100,000 and further including from about 5 to about 50 mole percent of dithiocarbamate salt groups to increase the size of the floc structures in the effluent stream;

(d) introducing a secondary stream containing gas bubbles into the effluent stream in an effective amount to produce an aerated effluent stream, wherein the combination of the gas bubbles, the at least one of aluminum chlorohydrate and metal sulfide, and the ethylene dichloride polymer form buoyant floc structures including the heavy metals;

(e) allowing the buoyant floc structures to rise to the surface of the aerated effluent stream; and (f) removing the buoyant floc structures from the effluent stream to produce a treated effluent stream.

19. A method of removing heavy metals from an effluent stream comprising:

providing an effluent stream containing heavy metals;

providing a secondary stream containing gas bubbles having diameters less than about 60 microns and introducing an effective amount of the secondary stream into the effluent stream to provide an effective amount of the gas bubbles within the effluent stream;

forming buoyant floc structures within the effluent stream by adding an effective amount of a flocculating polymer to the effluent stream and further providing a sufficient dwell time for the flocculating polymer to complex with the heavy metals present within the effluent stream, the flocculating polymer derived from a water soluble ethylene dichloride ammonia polymer further including dithiocarbamate salt functional groups that are capable of complexing with the heavy metals;

allowing the buoyant floc structures to rise to the surface of the turbulent effluent stream; and removing the buoyant floc structures containing the heavy metals from the effluent stream adjacent the surface to provide a treated effluent stream.

20. A method according to claim 19, further comprising the additional step of adding an effective amount of at least one of a metal salt or a metal scavenger to the effluent stream prior to adding the flocculating polymer.

21. A method according to claim 19, further comprising the additional step of adding effective amounts of both a metal salt and a metal scavenger prior to adding the flocculating polymer.

22. A method according to claim 21, wherein the additional adding step comprises adding the metal salt prior to adding the metal scavenger.

23. A method of removing heavy metals from an effluent stream comprising:

providing an effluent stream containing heavy metals at a flow rate sufficient to provide turbulent flow;

providing a secondary stream containing air bubbles and introducing an effective amount of the secondary stream into the effluent stream to provide an effective amount of air bubbles to form a turbulent aerated effluent stream;

forming flocculation sites within the turbulent aerated effluent stream by adding an effective amount of a metal salt into the aerated turbulent effluent stream to provide a pH of between about 6.5 and about 8.5 and further providing a sufficient dwell time for the flocculation sites to develop within the turbulent aerated effluent stream;

forming intermediate floc structures by adding an effective amount of a metal scavenger to the turbulent aerated effluent stream and further providing a sufficient dwell time for the intermediate floc structures to develop on the flocculation sites within the turbulent aerated effluent stream;

forming buoyant floc structures by adding an effective amount of a flocculating polymer to the turbulent aerated effluent stream and further providing a sufficient dwell time for the flocculating polymer to associate two or more of the intermediate floc structures present within the turbulent aerated effluent stream into buoyant floc structures;

allowing the buoyant floc structures to rise to the surface of the effluent stream; and removing the buoyant floc structures containing the heavy metals from the effluent stream adjacent the surface.

24. A method according to claim 23, wherein the flocculating polymer is derived from a water soluble ethylene dichloride ammonia polymer that further includes dithiocarbamate salt functional groups.

25. A method according to claim 23, wherein the metal salt is selected from the group consisting of aluminum chlorohydrate, aluminum chloride, polyaluminum chloride and mixtures thereof.

26. A method according to claim 23, wherein the metal scavenger is selected from the group consisting of metal sulfides, metal (thio)carbonates, metal thiocarbamate, mercaptans and mixtures thereof.

* * * * *